(12) United States Patent
Monosov et al.

(10) Patent No.: US 7,794,599 B2
(45) Date of Patent: *Sep. 14, 2010

(54) BIOREACTOR SYSTEM FOR MULTI-STAGE BIOLOGICAL WASTEWATER TREATMENT

(75) Inventors: Efim Monosov, Ariel (IL); Roman Nikolaevsky, Holon (IL); Vladimir Puziy, Haifa (IL); Maria Monosov, Ariel (IL)

(73) Assignee: Aquarius Technologies Inc., Port Washington, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/379,810

(22) Filed: Mar. 2, 2009

(65) Prior Publication Data

US 2009/0206031 A1 Aug. 20, 2009

Related U.S. Application Data

(63) Continuation of application No. 11/008,922, filed on Dec. 13, 2004, now Pat. No. 7,520,980.

(51) Int. Cl.
*C02F 3/10* (2006.01)
(52) U.S. Cl. .................... 210/615; 210/150
(58) Field of Classification Search .......... 210/150, 210/151, 615
See application file for complete search history.

(56) References Cited

U.S. PATENT DOCUMENTS

| 3,238,124 A | 3/1966 | Burton |
|---|---|---|
| 4,088,571 A | 5/1978 | Helgesson |
| 4,165,281 A | 8/1979 | Kuriyama et al. |
| 4,294,694 A | 10/1981 | Coulthard |
| 4,411,780 A | 10/1983 | Suzuki et al. |
| 4,422,930 A | 12/1983 | Hatanaka |
| 4,717,519 A | 1/1988 | Sagami |
| 5,085,766 A | 2/1992 | Bom |
| 5,104,716 A | 4/1992 | Basse et al. |
| 5,143,618 A | 9/1992 | Hyun et al. |
| 5,262,051 A | 11/1993 | Iwatsuka |

(Continued)

FOREIGN PATENT DOCUMENTS

DE 2230725 1/1974

(Continued)

OTHER PUBLICATIONS

Dong Hyun Chon, "Performance and Mechanisms of Excess Sludge Reduction in the Cannibal Process", Mar. 30, 2005, Blacksburg, Virginia, Introduction plus pp. 1-63.

(Continued)

*Primary Examiner*—Christopher Upton
(74) *Attorney, Agent, or Firm*—Walter Ottesen

(57) ABSTRACT

A bioreactor system for microbiological treatment of wastewater including: at least one highly-flexible substrate for providing a superficial environment conducive for supporting biomass growth, the substrate including: (a) a large plurality of threads disposed in a generally longitudinal direction and including a plurality of synthetic filaments, and (b) at least two cross-support elements disposed across and associated with the plurality of threads, so as to provide support for and loosely associate the threads, wherein openings defined by (i) adjacent threads of the threads, and (ii) adjacent cross-support elements of the elements, have an aspect ratio exceeding 50 to 1.

2 Claims, 5 Drawing Sheets

U.S. PATENT DOCUMENTS

| | | | |
|---|---|---|---|
| 5,399,266 | A | 3/1995 | Hasegawa |
| 5,516,691 | A | 5/1996 | Gerlach |
| 5,526,656 | A | 6/1996 | Conroy et al. |
| 5,567,314 | A | 10/1996 | Chigusa et al. |
| 5,824,222 | A | 10/1998 | Keyser et al. |
| 6,153,009 | A | 11/2000 | Weis et al. |
| 6,319,407 | B1 | 11/2001 | Maatta |
| 6,406,630 | B1 | 6/2002 | Henry |
| 6,689,166 | B2 | 2/2004 | Laurencin et al. |
| 6,808,628 | B2 | 10/2004 | Chang et al. |
| 7,022,231 | B2 | 4/2006 | Mahendran et al. |
| 7,118,672 | B2 | 10/2006 | Husain et al. |
| 7,169,295 | B2 | 1/2007 | Husain et al. |
| 7,175,763 | B2 | 2/2007 | Husain et at |
| 7,294,259 | B2 | 11/2007 | Cote et al. |
| 2003/0136746 | A1 | 7/2003 | Behmann et al. |
| 2003/0226804 | A1 | 12/2003 | Haley, III |
| 2004/0229343 | A1 | 11/2004 | Husain et al. |
| 2005/0051481 | A1 | 3/2005 | Husain et al. |
| 2006/0037896 | A1 | 2/2006 | Cote et al. |
| 2006/0163157 | A1 | 7/2006 | Cote et al. |
| 2006/0175243 | A1 | 8/2006 | Mahendran et al. |
| 2007/0181474 | A1 | 8/2007 | Lin |
| 2007/0238167 | A1 | 10/2007 | Perez et al. |
| 2008/0110827 | A1 | 5/2008 | Cote et al. |

FOREIGN PATENT DOCUMENTS

| | | |
|---|---|---|
| JP | 8-337956 | 12/1996 |
| JP | 11-309475 | 11/1999 |
| JP | 2001-239292 | 9/2001 |
| JP | 2001-248044 | 9/2001 |
| JP | 2002-119990 | 4/2002 |
| JP | 2005-66432 | 3/2005 |
| RU | 2078162 | 4/1997 |
| WO | WO9600261 | 8/1996 |
| WO | WO02079104 | 10/2002 |

OTHER PUBLICATIONS

Ruth Roxburgh et al., "Sludge Minimization Technologies Doing More to Get Less", Copyright 2006, pp. 506-525.

BioScape Technologies—Wastewater Purification Systems from internet server www.bioscapetechnologies.com/technical.html, copyright 2003, pp. 1-4.

BioScape Technologies—Wastewater Purification Systems from internet server www.bioscapetechnologies.com/process.html, Process Description, pp. 1-2.

Bioscape Technologies—Wastewater Purification Systems from internet server www.bioscapetechnologies.com/photos.html, Bioreactor for Intensive and Final Purification pp. 1-3.

BioScape Technologies—Wastewater Purification Systems from internet server www.bioscapetechnologies.com/systems.html, Systems in Place, pp. 1-2.

BioFicient innovative BioFicient Treatment Process Eliminates Regular Biosolids Wasting/Handling, smithandloveless.com.

Our Proven Cannibal Process Eliminates Biosolids Wasting, pp. 1-2, Article Commercial.

2 pp. of drawings from JH Ranch Elif Technologies.

US 7,794,599 B2

BIOREACTOR SYSTEM FOR MULTI-STAGE BIOLOGICAL WASTEWATER TREATMENT

CROSS REFERENCE TO RELATED APPLICATION

Benefit of international priority and internal priority is claimed under all applicable international treaties and national laws throughout the world as to the subject matter of U.S. patent application Ser. No. 11/008,922, filed on Dec. 13, 2004, now issued on Apr. 21, 2009 as U.S. Pat. No. 7,520,980 in the names of Efim Monosov, Roman Nikolaevsky, Vladimir Puziy and Maria Monosov, and this application is a continuation of said application, and entitled BIOREACTOR SYSTEM FOR MULTI-STAGE BIOLOGICAL WASTEWATER, incorporated herein by reference.

FIELD AND BACKGROUND OF THE INVENTION

The present invention relates to biological wastewater treatment systems, and more particularly, to a bioreactor system for multi-stage biological wastewater treatment based on spatial microorganisms successions and trophic hydrobionts chains.

It is known that a spatially segregated trophic microorganism chain provides conditions at which larger organisms consume smaller ones. Such a spatial microorganism succession forms a basis for purification processes by means of both aerobic and anaerobic destruction of microorganisms. The result of such a succession is an increased efficiency of biochemical treatment and a reduced quantity of surplus biomass. Such purification processes are suitable for both domestic and industrial wastewaters, even those containing high levels of organic and inorganic impurities. Characteristically, systems for wastewater treatment by trophic microorganism chains include bioreactors having modular spatial aerobic and anaerobic units. Each bioreactor is provided with a controlled air supply that maintains the oxygen level needed for the activity of the microorganisms and enhances the biomass exchange.

Prior art bioreactors suffer from various drawbacks. Trickling filters require a large space, generate secondary pollution including bad odors, and attract flies. Activated sludge processes generate large amounts of biomass that need careful monitoring due to sudden changes in biomass loading and plugging. Rotational bioreactors are more compact, however, they are expensive and prone to mechanical problems.

It is known that bioreactors using fixed submerged biomass usually perform well at low biomass loadings, but are easily plugged by excessive buildup of biomass, therefore, demanding periodic cleaning or replacing of the submerged biomass. These prior art fixed submerged biomass bioreactors require many bioreactors to keep the loading low to maintain the purification efficiency. Consequently these wastewater-treating facilities demand frequent monitoring, good control of flow and load, and are expensive to install, operate and maintain.

U.S. Pat. No. 4,005,010 to Lunt describes a wastewater treatment system having mesh sacks containing a biological medium. The sacks are apparently designed to hold the microbes while allowing fluids to pass through. The biological medium is prone to clogging over the course of operation.

U.S. Pat. No. 4,165,281 to Kuriyama, et al., describes a wastewater treatment system that includes a substrate designed to contain the microorganisms. A plurality of vertically disposed substrates is designed for wastewater to pass therethrough. The likelihood of plugging is greater in this unit than in the Lunt device, due to the orientation of the substrates and to the difficulty in maintaining and/or replacing them.

U.S. Pat. No. 4,279,753 to Nielson, et al., describes the arrangement of a plurality of treatment reactors alternating from aerobic to anaerobic action. While Nielson indicates that it is necessary to address plugging problems, the technique for doing so is relatively crude and appears to be less than completely effective.

U.S. Pat. No. 4,521,311 to Fuchs, et al., teaches the use of a filtering bed through which the wastewater passes and which includes support bedding to suspend the biological medium. The device has a rather complex recirculation process in order to ensure cleaning of the bedding and the microbes. This device may experience additional kinds of clogging problems, and the disclosed bedding particles are required to go through a costly maintenance operation.

U.S. Pat. No. 5,221,470 to McKinney describes a wastewater treatment plant having a final filter made of a sheet of plastic. The sheet of plastic is wrapped about itself so as to form passageways designed for microbe growth. While this design may increase the surface area and, therefore, the dwell time available for microbial action, it is likely that plugging will occur as the passageway fills with dead microbes over a period of time.

In summary, prior-art bioreactor systems for multi-stage biological wastewater treatment are often plagued by inefficiency over a period of operation. When the wastewater to be treated requires the use of a considerable amount of biological mass, there results a problem of plugging of the mass. As waste solids build up on the surface of the mass, or as microbes ingest the pollutants and die, such solids do not always fall to the bottom of the bioreaction tank. Instead, the solids become trapped at or near the surface of the mass. This plugging or blocking of the mass significantly reduces the pathways by which subsequent pollutants may pass through to underlying active microbes that are located below the surface of the mass. Consequently, the acceleration of pollutant decay caused by microbe ingestion is compromised, and water flow through the mass is reduced and may even be stopped. It is therefore necessary to either build a substantially larger bioreactor unit than would otherwise be required—in order to account for this plugging—or to regularly clean the clogged system.

There is therefore a recognized need for, and it would be highly advantageous to have a bioreactor system for multi-stage biological wastewater treatment that is robust and efficient, simple to operate, insusceptible to plugging, and inexpensive to install and maintain.

SUMMARY OF THE INVENTION

According to the teachings of the present invention there is provided a multiple stage bioreactor system for microbiological treatment of wastewater, the bioreactor system including: at least one highly-flexible substrate for providing a superficial environment conducive for supporting biomass growth, the substrate including: (a) a large plurality of threads, the threads disposed in a generally longitudinal direction and including a plurality of synthetic filaments, and (b) at least two cross-support elements disposed across and associated with the plurality of threads, so as to provide support for and loosely associate the threads, wherein openings defined by (i) adjacent threads of the threads, and (ii) adjacent cross-support elements of the elements, have an aspect ratio exceeding 50 to 1.

According to further features in the described preferred embodiments, the aspect ratio exceeds 200 to 1.

According to still further features in the described preferred embodiments, the aspect ratio exceeds 500 to 1.

According to still further features in the described preferred embodiments, the aspect ratio exceeds 2000 to 1.

According to still further features in the described preferred embodiments, the length extension of the threads in the substrate is in a range of 80% to 98%.

According to still further features in the described preferred embodiments, the length extension of the threads is in a range of 90% to 95%.

According to still further features in the described preferred embodiments, the threads include at least one synthetic material selected from the group consisting of polyamide, polypropylene, and cross-linked polyester.

According to still further features in the described preferred embodiments, the at least two cross-support elements are woven elements interwoven with the threads.

According to still further features in the described preferred embodiments, the woven elements include at least one synthetic material selected from the group consisting of polyamide, polypropylene, and cross-linked polyester.

According to still further features in the described preferred embodiments, the cross-support elements form an angle, with respect to the threads, in a range of 30° to 90°.

According to another aspect of the present invention there is provided a multiple stage bioreactor system for microbiological treatment of wastewater, the bioreactor system including: at least one substrate for providing a superficial environment conducive for culturation of microbes, the substrate including: (a) a large plurality of threads, the threads disposed in a generally longitudinal direction, and (b) at least two cross-support elements disposed across and associated with the plurality of threads, so as to provide support for and loosely associate the threads, wherein a length extension of the threads in the substrate is in a range of 80% to 98%.

According to yet another aspect of the present invention there is provided a multiple stage bioreactor system for microbiological treatment of wastewater, the bioreactor system including: at least one bioreactor including: (a) a feed inlet for receiving a stream of at least partially-untreated wastewater; (b) a plurality of substrate bundles, each bundle including a plurality of laminar substrates for supporting biomass growth, each of the substrates having threads including a plurality of synthetic filaments, the substrates being juxtaposed in a substantially parallel manner with respect to each other, within the bioreactor, (c) an air supply manifold for fluidly connecting to an air source, the manifold including a plurality of diffusing elements, for forced rising and diffusion of air, the diffusing elements positioned with respect to the substrate bundles such that the air rises and diffuses through the laminar substrates, and wherein the diffusing elements are further positioned with respect to the plurality of substrates such that the rising of air creates a controlled hydrodynamic circulation within the bioreactor, the controlled hydrodynamic circulation being characterized by a linear velocity range bounded by an upper level that enables biomass to settle on the laminar substrates, and bounded by a lower level that provides a pre-determined minimum level of available oxygen throughout the substrates.

According to further features in the described preferred embodiments, the substrate bundle is disposed between adjacent elements of the diffusing elements, and wherein the diffusing elements are disposed substantially opposite to a large face of the substrates.

According to still further features in the described preferred embodiments, the single substrate bundle includes 2 to 12 of the substrates.

According to still further features in the described preferred embodiments, from 3 to 8 of the substrates are juxtaposed between adjacent elements of the diffusing elements.

According to still further features in the described preferred embodiments, from 4 to 7 of the substrates are juxtaposed between adjacent elements of the diffusing elements.

According to still further features in the described preferred embodiments, the distance between the diffusing elements and the substrates is between 10 and 30 cm, so as to achieve the controlled hydrodynamic circulation.

According to still further features in the described preferred embodiments, the distance between the substrates and a bottom of the bioreactor is between 50 and 80 cm, so as to achieve the controlled hydrodynamic circulation.

According to still further features in the described preferred embodiments, the diffusing elements are further positioned with respect to the plurality of substrates such that a major stream of oxygen-containing liquid flows down, through clearances between adjacent substrates of the substrates, towards a bottom of the bioreactor.

According to still further features in the described preferred embodiments, the threads are disposed in a generally longitudinal direction, and wherein each of the substrates further includes at least two cross-support elements, disposed across and associated with the plurality of threads, so as to provide support for and loosely associate the threads, and wherein the cross-support elements are positioned so as to effect turbulent flow of the wastewater between the substrates.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
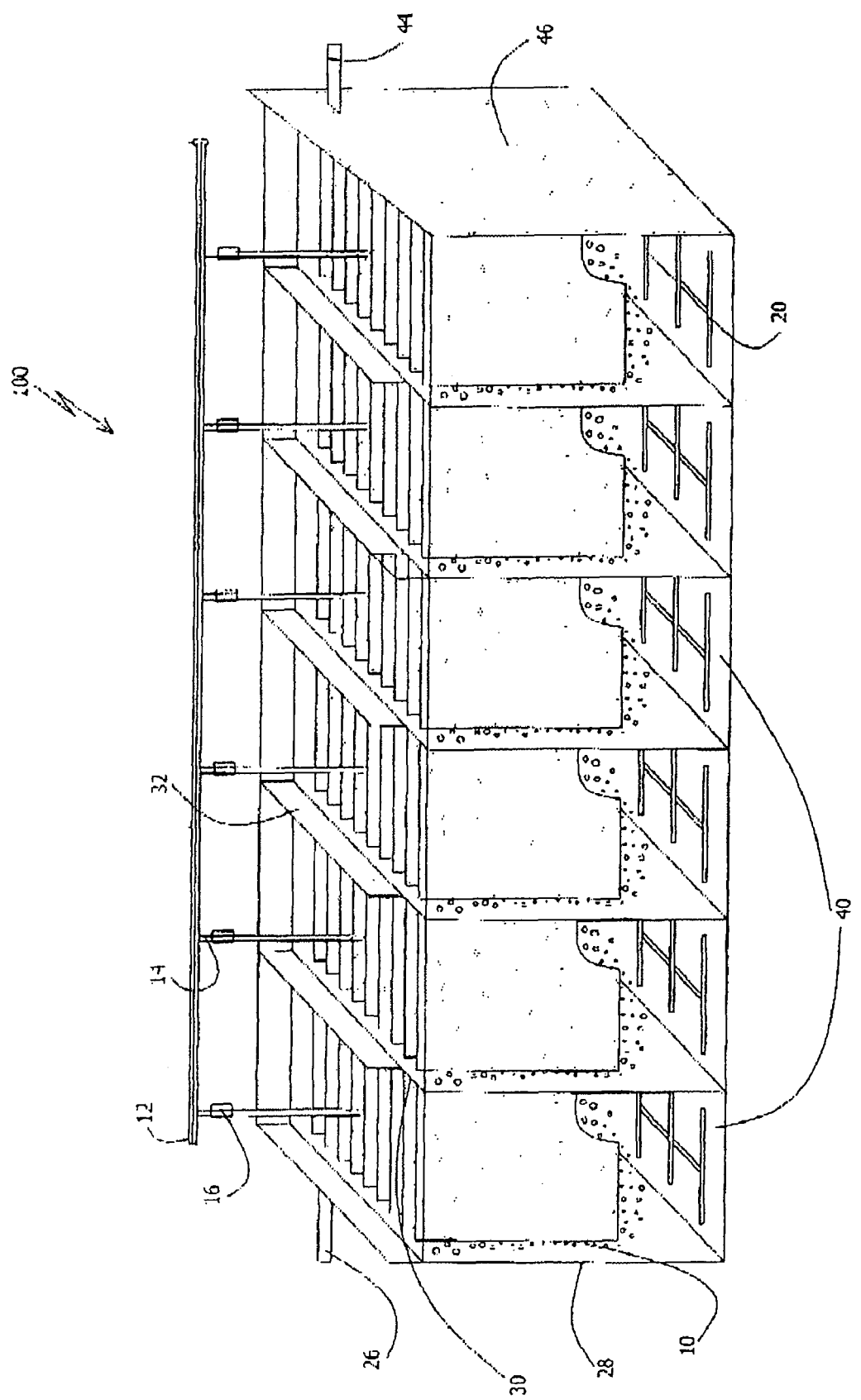
FIG. 1 shows a multi-stage biological activated bioreactor system for wastewater treatment based on spatial microorganisms successions and trophic hydrobionts chains.

The present invention is a bioreactor system for treating wastewater, using fixed submerged substrates for the biomass. The bioreactor system is robust and efficient, simple to operate, and highly insusceptible to plugging.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

The principles and operation of the system according to the present invention may be better understood with reference to the drawings and the accompanying description.

Referring now to the drawings, FIG. 1 shows a multi-stage biological activated bioreactor system 100 for wastewater treatment based on spatial microorganisms successions and trophic hydrobionts chains. Multi-stage bioreactor system 100 includes a plurality (six are shown) of associated bioreactors 40.

Air supply header 12, connected to an air supply source (not shown in the drawing) supplies the oxygen required in each bioreactor 40 by secondary air lines 14 and check valves 16. These air flows are controlled according to the oxygen demand in each specific bioreactor 40. Secondary air lines 14 deliver air to manifolds 20, disposed near or at a bottom 18 of each bioreactor 40. Manifolds 20 divide the air supply into yet smaller streams, from which emerge upward-flowing air streams via diffusing elements 22 (shown in FIG. 3).

Generally, systems that employ such diffusing elements are superior in treating ability and treating efficiency to a conventional fixed-bed process. Fixed-bed processes, as disclosed, for example, in Sadao Kojima, Yosui To Haisui, Industrial Water and Waste Water, 14, p. 960, (1972) and Y. Maeda, Journal of Fermentation Technology, 53, p. 875 (1975), suffer from excessive clogging of biomass on the supporting media or substrates and from excessive sloughing of falling biomass. Consequently, prior art systems deal mainly with this problem and do not deal with improving the hydrodynamics of the bioreactors.

Figure 3:
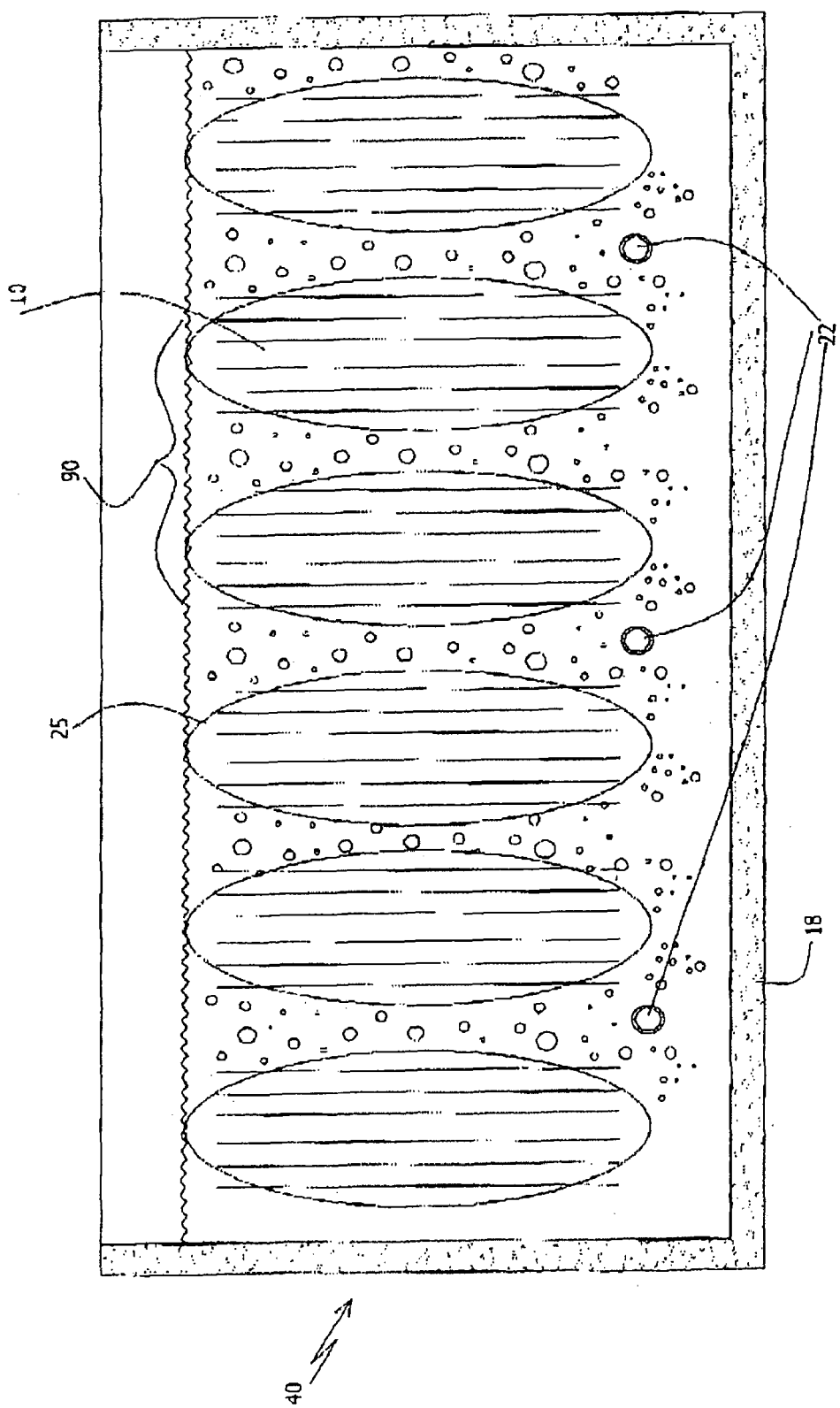
FIG. 3 illustrates the hydrodynamic circulation within a bioreactor, according to the present invention.

In sharp contrast to the prior art, one aspect of the present invention focuses on, and appreciably improves, the hydrodynamics of bioreactor 40. Referring now to FIG. 3, air diffused from diffusing elements 22 rises at a linear velocity so as to produce, in bioreactor 40, an "air-lift" effect in which the liquid is carried upwards by the rising air bubbles.

Hydrodynamic circulation within bioreactor 40 is achieved by positioning each diffusing element 22 with respect to substrates 10 such that a major stream of liquid flows up from diffusing element 22 between two substrates 10 that immediately surround diffusing element 22. This causes a hydrodynamic circulation 25 around the top of substrates 10, and down, through the clearances between substrates 10, and through a middle region of substrate bundle 90, towards bottom 18 of bioreactor 40. This hydrodynamic pattern can be advantageously controlled such that a pre-determined minimum level of oxygen is delivered throughout substrates 10, and such that the linear velocity of liquid flowing up from diffusing element 22 is sufficiently low to avoid turbulence and to allow biomass to settle so as to achieve optimal buildup on substrates 10.

It has been found that in order to achieve the inventive hydrodynamic circulation pattern described hereinabove, the number of substrates 10 between adjacent diffusing elements 22 should be in the range of 2 to 14, preferably in the range of 2 to 12, more preferably in the range of 3 to 8, and most preferably, 5 or 6.

Additionally, as will be readily apparent to one skilled in the art, the circulation is influenced and controlled by the number of diffusing elements 22, the distance between them, the distance between diffusing elements 22 and the lower edge of substrates 10, the number of substrates 10 in bioreactors 40, the distance between adjacent substrates 10, and wastewater and air flows.

Multi-stage treatment system 100 is continuously fed with wastewater, or partially-treated wastewater, via inlet 26, which is disposed in an upper part of a first sidewall 28 of system 100. The effluent from the first bioreactor of bioreactors 40 overflows into an adjacent bioreactor through discharge opening 30, located at an opposite side of the first bioreactor, with respect to inlet 26. Similarly, the effluent of the second bioreactor of bioreactors 40 overflows to the third bioreactor of bioreactors 40 through discharge opening 32. Discharge openings 30 and 32 (as well as the discharge openings of all other bioreactors 40) are preferably disposed with respect to one another so as to minimize short-circuiting phenomena within each bioreactor 40.

The treated water produced is discharged from system 100 via outlet 44, which is disposed in an upper part of a second sidewall 46.

Figure 2A:
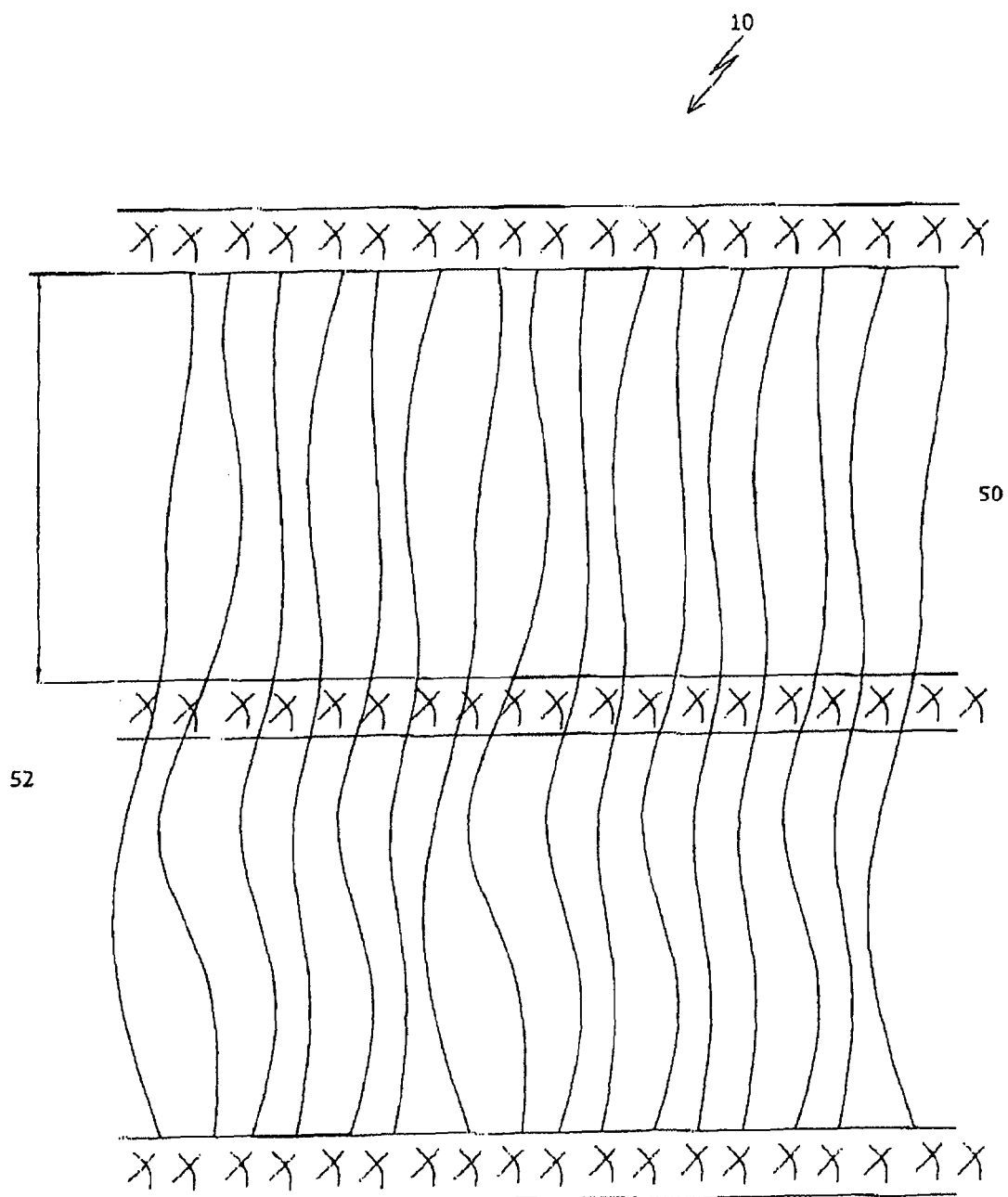
FIG. 2a is a side view of a substrate for biomass buildup.

Referring now to FIG. 2a, FIG. 2a is a side view of a substrate 10 for biomass buildup. Substrate 10 is a loose, laminar, synthetic filter material for supporting biomass growth. Substrate 10, which normally has a height of 1.5 to 4.5 m, a width of 1 to 2 n, and a thickness of only 2 to 10 mm, includes longitudinal threads 50, having a linear density of 100 to 500 dtex, and preferably 200 to 400 dtex. Each thread 50 is typically made up of about 200 to about 500 filaments that provide an enhanced surface area for biomass growth.

Threads 50 are associated and held together by a small number of cross-support elements 52, typically disposed in transverse fashion with respect to threads 50. Each cross-support element 52 is preferably a strip having a width of 2 to 10 cm, and is advantageously formed of interwoven cross threads 80 as shown in FIG. 2c.

The distance between cross-support elements 52 is at least 20 cm, and preferably, 20 to 50 cm.

In prior-art mesh substrates, the ratio of the length to the width of the mesh openings is 1:1 to 1:3 and more typically, about 1:1. By sharp contrast, the ratio of the length to the width of the openings formed by threads 50 and strips 52, according to the present invention, is greater than 1:50, preferably greater than 1:200, more preferably, greater than 1:500 and even more preferably, greater than 1:2000. Inventive substrate 10 is thus extremely flexible and has large openings with respect to prior-art substrates. Consequently, the biomass has much less firm support, and biomass build-up—which leads to plugging—tends to significantly decrease.

As used herein in the specification and in the claims section that follows, the term "aspect ratio" refers to a ratio between the length and the width of an opening formed by adjacent threads 50 and adjacent cross-support elements 52 in a substrate.

Figure 2B:
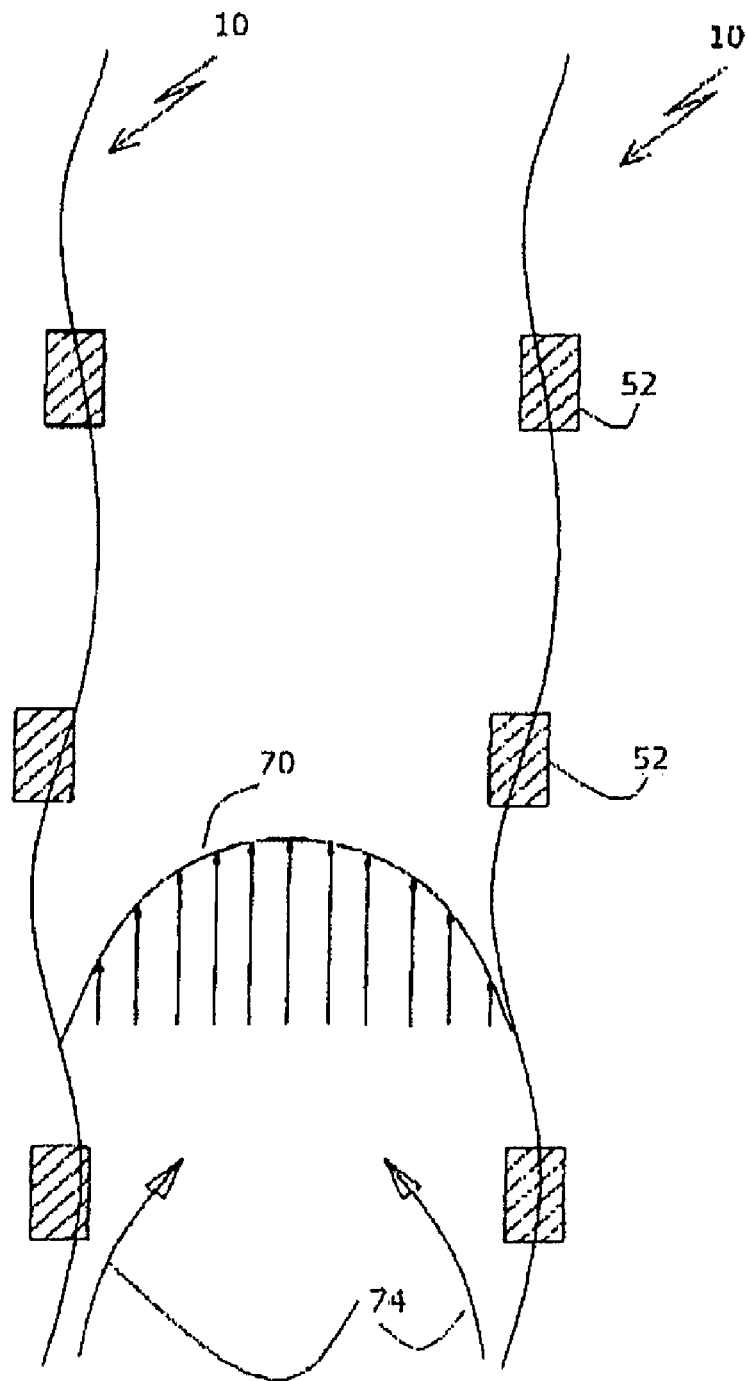
FIG. 2b shows a flow regime of liquid within two adjacent substrates.
Figure 2C:
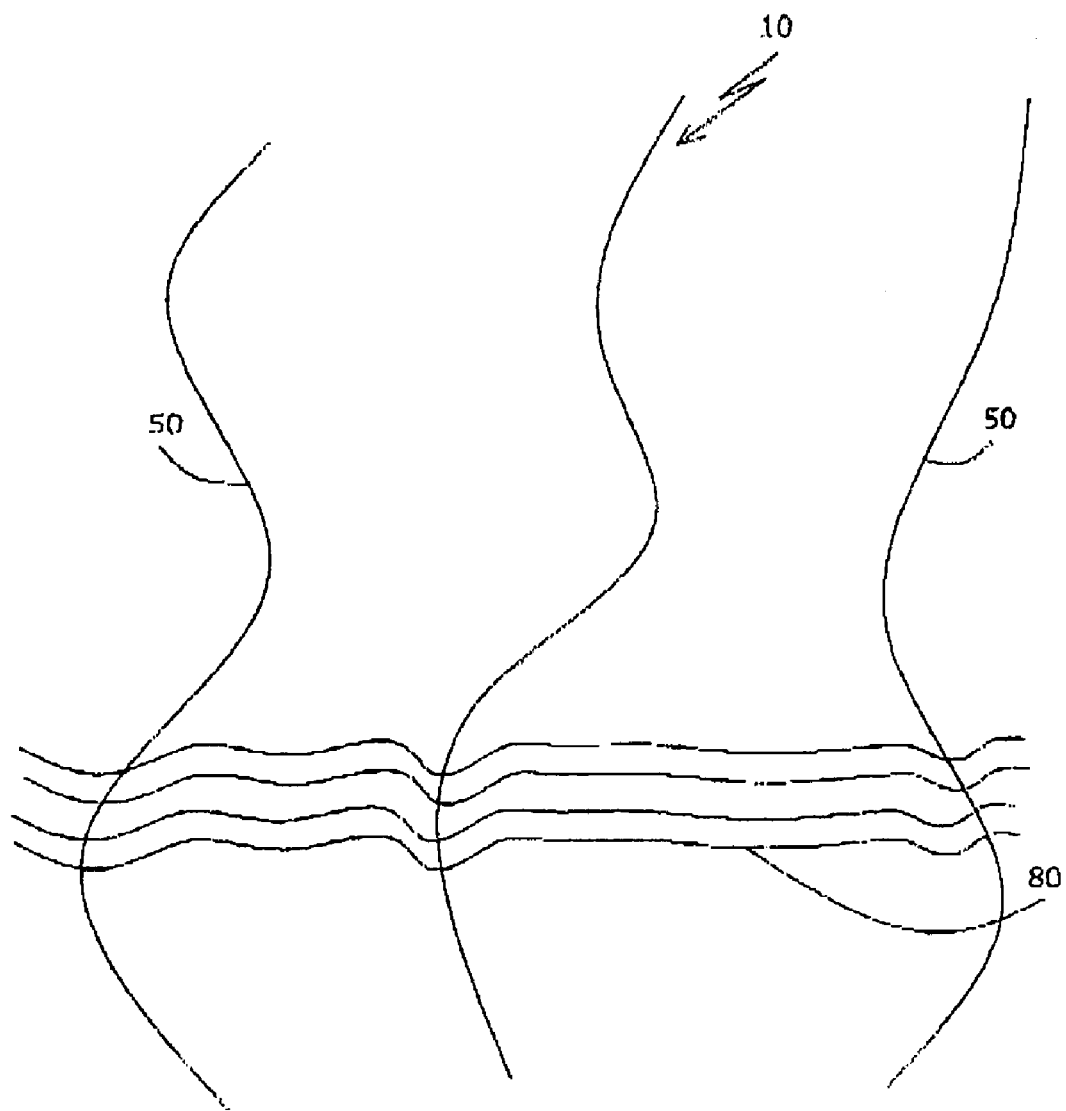
FIG. 2c schematically describes the cross-support elements interwoven with threads of the substrates.

Cross-support elements 52 are advantageously thicker than threads 50, so as to restrict water flow 74 between juxtaposed substrates 10, as shown in FIG. 2b. Thus, instead of the laminar flow characteristic of prior-art systems, the inventive system is characterized by a turbulent flow regime 70 between substrates 10, which enhances the oxygen supply needed for biomass growth.

The length extension of the vertical threads 50 in substrate 10 has also been found to be of paramount importance in attaining optimal biomass build-up. As used herein in the specification and in the claims section that follows, the term "length extension" refers to a ratio, expressed in percent, between the length of a section of a substrate between adjacent cross-support elements (L in FIG. 2a), and the average length of the threads forming that section. By way of example, in a substrate in which the threads are associated by cross-support elements at the top end and at the bottom end of the substrate, and in which (1) the substrate length L is 0.45 meters, and (2) the average length of the threads is 0.5 meters, the length extension would be equal to 100*0.45/0.5, or 90%.

The length extension of substrate 10 typically exceeds 80%, preferably lies within a range of 85% to 98%, more preferably, within a range of 90% to 95%, and most preferably, within a range of 92% and 95%. Within these narrow ranges of the length extension, adjacent threads 50 have a suitable flexibility, with respect to one another, so as to enable controlled biomass buildup on substrates 10.

Consequently, sloughing is greatly reduced and sloughing of falling biomass as a result of excessive biomass buildup is avoided, as well as excessive biomass loading of down stream bioreactors due to excessive biomass carryover as sloughing from former bioreactors of the multi-stage system.

Threads 50 and cross threads 80 are preferably made of synthetic materials such as polyamide, polypropylene, cross-linked polyester, or any combination thereof. These water-resistant materials enable long-term fabric durability in the aqueous medium, while their low shrinkage properties allow the initial (i.e., at the time of installation) fabric tension of substrates 10 to be preserved.

Typical purification efficiencies of a multi-stage biological activated wastewater treatment system of the present invention are provided in Table 1.

TABLE 1

| Purification Efficiency of A Multi-Stage Biological Activated Waste Water Treatment | |
|---|---|
| Biological Oxygen Demand (BOD) | 97%-99.5% |
| Chemical Oxygen Demand (COD) | 85%-95% |
| Total Suspended Solids (TSS) | 95%-97% |
| $NH_4^+$ | 90%-99% |
| Oil & Grease | 95%-100% |
| Detergents | 80%-95% |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. Pat. Nos. 4,005,010, 4,165,281, 4,279,753, 4,521,311, and 5,221,470, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for microbiological treatment of domestic and/or industrial wastewater, comprising:
   providing a plurality of successive zones in which are respectively disposed a plurality of flexible biomass-supporting substrates each comprising a plurality of threads and spaced apart cross-support elements associated with and supporting the threads, the cross-supports being disposed in angular relationship to a generally longitudinal direction in which the threads extend, said threads engaging the cross-supports and, within distance intervals between the cross-supports, having thread segments that are in loose association with one another,
   providing in a plurality of substrates: a thread segment aspect ratio, which is a ratio of distances between adjacent cross-support elements relative to side-to-side or lateral distances between adjacent threads, that exceeds 50 to 1; and a length extension of the threads, which is a ratio expressed in percent, between the length of a section of substrate between adjacent cross-support elements and the average length of the threads forming that section, that is in the range of 80% to 98%,
   causing wastewater to move through said zones in contact with the substrates thereof while maintaining in a succession of said zones on the substrates thereof a spatially segregated chain of trophic microorganisms distributed in succession in said zones on the loosely associated flexible biomass-supporting substrates of the respective zones,
   generating gas currents in the wastewater in said zones, and causing said currents to move along the threads in said generally longitudinal direction, characterized by a linear velocity range bounded by an upper level that enables biomass to settle on said substrates, and bounded by a lower level that provides oxygen sufficient to meet an oxygen demand in said wastewater.

2. A multi-stage bioreactor system useful for microbiological treatment of domestic and/or industrial wastewater by biomass, comprising
   a plurality of successive bioreactor portions, separated by walls, in which are respectively disposed a plurality of flexible biomass-supporting substrates comprising threads disposed in a generally longitudinal direction
   cross-support elements disposed in angular relationship with and spaced apart from adjacent cross-supports by at least 20 cm. in said longitudinal direction, which cross-supports are associated with said plurality of threads, so as to support the threads by engaging the threads at the cross-supports while providing, within distance intervals between the cross-supports, loose association between laterally adjacent thread segments of said substrates,
   wherein the biomass comprises a spatially segregated chain of trophic microorganisms distributed in succession in said portions on the loosely associated flexible biomass-supporting substrates of the respective portions,
   wherein the thread segment aspect ratio, which is a ratio of distances between adjacent cross-support elements relative to side-to-side or lateral distances between adjacent threads, exceeds 200 to 1,
   wherein the length extension of the threads, which is a ratio expressed in percent, between the length of a section of substrate between adjacent cross-support elements and the average length of the threads forming that section, is in the range of 80% to 98%,
   a plurality of diffusing elements, fluidly connected with a source of oxygen-containing gas for treatment of the wastewater, positioned to generate rising gas currents in the wastewater and having sufficient gas discharge capacity to produce, with said rising currents, a controlled hydrodynamic circulation within said bioreactor characterized by a linear velocity range bounded by an upper level that enables biomass to settle on said substrates, and bounded by a lower level that provides oxygen sufficient to meet an oxygen demand in said bioreactor, wherein said diffusing elements are further positioned with respect to said plurality of substrates such that a stream of oxygen-containing liquid flows down, through clearances between adjacent substrates, towards a bottom of said bioreactor, and takes part in said hydrodynamic circulation, and wherein the substrate threads are positioned to cause the rising currents to pass along the threads in said generally longitudinal direction.

* * * * *